US009060062B1

(12) United States Patent
Madahar et al.

(10) Patent No.: US 9,060,062 B1
(45) Date of Patent: Jun. 16, 2015

(54) CLUSTERING AND CLASSIFICATION OF RECENT CUSTOMER SUPPORT INQUIRIES

(75) Inventors: Sachan Madahar, Cerritos, CA (US); Ilie Ovidiu Grigore, Irvine, CA (US); Kim Nga Thi Moore, Irvine, CA (US); Igor Belilovets, Irvine, CA (US)

(73) Assignee: GOOGLE INC., Mountain View, CA (US)

( * ) Notice: Subject to any disclaimer, the term of this patent is extended or adjusted under 35 U.S.C. 154(b) by 190 days.

(21) Appl. No.: 13/177,426

(22) Filed: Jul. 6, 2011

(51) Int. Cl.
*H04M 3/00* (2006.01)
*H04M 3/51* (2006.01)

(52) U.S. Cl.
CPC .................................. *H04M 3/5183* (2013.01)

(58) Field of Classification Search
USPC ............................. 379/265.01–265.02, 266.07
See application file for complete search history.

(56) References Cited

U.S. PATENT DOCUMENTS

| | | | |
|---|---|---|---|
| 5,671,438 | A | 9/1997 | Capps et al. |
| 6,141,653 | A | 10/2000 | Conklin et al. |
| 6,260,024 | B1 | 7/2001 | Shkedy |
| 6,754,636 | B1 | 6/2004 | Walker et al. |
| 6,963,867 | B2 | 11/2005 | Ford et al. |
| 7,587,367 | B2 | 9/2009 | Mengerink |
| 7,644,019 | B2 | 1/2010 | Woda et al. |
| 7,711,653 | B1 | 5/2010 | Denham et al. |
| 8,244,599 | B2 | 8/2012 | Sudaresan |
| 8,348,767 | B2 | 1/2013 | Mahajan et al. |
| 8,381,120 | B2 | 2/2013 | Stibel et al. |
| 8,515,791 | B2 | 8/2013 | Woda et al. |
| 8,700,487 | B2 | 4/2014 | Grass et al. |
| 2002/0018554 | A1* | 2/2002 | Jensen et al. ............. 379/265.01 |
| 2002/0178074 | A1 | 11/2002 | Bloom |
| 2003/0086557 | A1* | 5/2003 | Shambaugh et al. ..... 379/266.07 |
| 2003/0135432 | A1 | 7/2003 | McIntyre et al. |
| 2003/0198336 | A1* | 10/2003 | Rodenbusch et al. ..... 379/265.02 |
| 2004/0044624 | A1 | 3/2004 | Katao et al. |
| 2004/0210527 | A1 | 10/2004 | Woda et al. |
| 2005/0105712 | A1* | 5/2005 | Williams et al. ......... 379/265.02 |

(Continued)

FOREIGN PATENT DOCUMENTS

| | | |
|---|---|---|
| KR | 200900000700 A1 | 1/2009 |
| WO | 2006065546 A2 | 6/2006 |
| WO | 2011019749 A2 | 2/2011 |

OTHER PUBLICATIONS

""FirePoppy, Broker Pro"—FirePoppy, Inc.", Retrieved on May 19, 2011 from the internet >URL:http://replay.web.archive.org/20030822021619/http://firepoppy.com/broker_pro.phtml>, Aug. 22, 2003, 1.

(Continued)

*Primary Examiner* — Rasha Al Aubaidi
(74) *Attorney, Agent, or Firm* — Johnson, Marcou & Isaacs, LLC

(57) ABSTRACT

A system and machine-implemented method relating to enhanced customer service via processing a first communication from a customer via a first communication service, automatically obtaining a first classification, included in a plurality of predefined classifications for customer support issues, associated with the first communication, establishing a second communication between the customer and a customer service representative, and displaying to the customer service representative information about the first communication with an indication that the first classification is associated with the first communication.

24 Claims, 5 Drawing Sheets

(56) References Cited

U.S. PATENT DOCUMENTS

| | | | |
|---|---|---|---|
| 2006/0224398 A1 | 10/2006 | Lakshman et al. | |
| 2006/0252547 A1 | 11/2006 | Mizrahi et al. | |
| 2007/0038620 A1 | 2/2007 | Ka et al. | |
| 2007/0083523 A1 | 4/2007 | Gerard et al. | |
| 2007/0112867 A1 | 5/2007 | Evans et al. | |
| 2007/0130109 A1 | 6/2007 | King et al. | |
| 2007/0150355 A1 | 6/2007 | Meggs | |
| 2007/0174144 A1 | 7/2007 | Borders et al. | |
| 2007/0219958 A1 | 9/2007 | Park et al. | |
| 2007/0255606 A1 | 11/2007 | Huang et al. | |
| 2008/0010319 A1 | 1/2008 | Vonarburg et al. | |
| 2008/0033781 A1 | 2/2008 | Peretti | |
| 2008/0071638 A1 | 3/2008 | Wanker | |
| 2008/0077490 A1 | 3/2008 | Wolfe et al. | |
| 2008/0208714 A1 | 8/2008 | Sundaresan | |
| 2008/0270209 A1 | 10/2008 | Mauseth et al. | |
| 2009/0012880 A1 | 1/2009 | Tortola | |
| 2009/0063247 A1 | 3/2009 | Burgess et al. | |
| 2009/0089135 A1 | 4/2009 | Minert et al. | |
| 2009/0119160 A1 | 5/2009 | Woda et al. | |
| 2009/0138441 A1 | 5/2009 | Valentine et al. | |
| 2009/0144070 A1 | 6/2009 | Psota et al. | |
| 2009/0144157 A1 | 6/2009 | Saracino et al. | |
| 2009/0164338 A1 | 6/2009 | Rothman | |
| 2009/0182647 A1 | 7/2009 | Sundaresan | |
| 2009/0265430 A1 | 10/2009 | Bechtel et al. | |
| 2009/0285384 A1* | 11/2009 | Pollock et al. | 379/265.09 |
| 2009/0292548 A1 | 11/2009 | Van Court | |
| 2010/0114664 A1 | 5/2010 | Jobin | |
| 2010/0114776 A1 | 5/2010 | Weller et al. | |
| 2010/0174566 A1 | 7/2010 | Helitzer et al. | |
| 2010/0174568 A1 | 7/2010 | Burke, Jr. | |
| 2010/0274609 A1 | 10/2010 | Shoemaker et al. | |
| 2010/0306123 A1 | 12/2010 | Cai et al. | |
| 2010/0312555 A1 | 12/2010 | Plumpe et al. | |
| 2011/0071950 A1 | 3/2011 | Ivanovic | |
| 2011/0125593 A1 | 5/2011 | Wright et al. | |
| 2011/0137747 A1 | 6/2011 | Bodeman et al. | |
| 2011/0191106 A1 | 8/2011 | Khor et al. | |
| 2011/0191211 A1 | 8/2011 | Lin | |
| 2011/0231282 A1 | 9/2011 | Dai | |
| 2011/0296321 A1 | 12/2011 | Lord | |
| 2012/0047024 A1 | 2/2012 | Urban et al. | |
| 2012/0059931 A1 | 3/2012 | Graupner et al. | |
| 2012/0095845 A1 | 4/2012 | Shani | |
| 2012/0130910 A1 | 5/2012 | Al-Alami | |
| 2012/0150574 A1 | 6/2012 | Reid et al. | |
| 2012/0150598 A1 | 6/2012 | Griggs | |
| 2012/0221563 A1 | 8/2012 | De et al. | |
| 2012/0246004 A1 | 9/2012 | Book et al. | |
| 2012/0265644 A1 | 10/2012 | Roa et al. | |
| 2012/0284132 A1 | 11/2012 | Kim et al. | |
| 2012/0324585 A1 | 12/2012 | Beckett, III et al. | |
| 2013/0014144 A1 | 1/2013 | Bhatia et al. | |
| 2013/0080221 A1 | 3/2013 | Ling et al. | |
| 2013/0166457 A1 | 6/2013 | Du et al. | |
| 2013/0204744 A1 | 8/2013 | Grass et al. | |
| 2013/0325592 A1 | 12/2013 | Woda et al. | |

OTHER PUBLICATIONS

""Shopatron FAQ, "Firepoppy, Inc.", Retrieved from the Internet on May 19, 2011 <URL:http://replay.web.archive.org/2004011702145/http://firepoppy.com/FAQ.phtml>, Jan. 17, 2004, 1-3.

"Screenshots: Shopatron, Shopatron, Ltd. 1999", retrieved from the internet on Aug. 10, 2000: <http://shoptraon.ooi.net/shoppping_cart.phtml>, Jan. 1, 1999, 1-7.

"Shopatron: Letter from Ed Stevens, President, Firepoppy, Inc. to Jim Hudson, Sullivan Products", Sep. 12, 2000, 1-6.

Abdelsalam, "Office Action issued in copending U.S. Appl. No. 13/593,256, filed Aug. 23, 2012", Dec. 17, 2013, 1-9.

Algibhah, "Office Action issued in copending U.S. Appl. No. 13/593,430, filed Aug. 23, 2012", May 21, 2014, 1-10.

Harrington, "Office Action issued in copending U.S. Appl. No. 13/309,472, filed Dec. 1, 2011", Jun. 17, 2014, 1-17.

Harrington, "Office Action issued in copending U.S. Appl. No. 13/309,472, filed Dec. 1, 2011", Jul. 24, 2013, 1-15.

Harrington, "Office Action issued in copending U.S. Appl. No. 13/309,472, filed Dec. 1, 2011", Oct. 27, 2014, 1-18.

Harrington, "Office Action issued in copending U.S. Appl. No. 13/309,472, filed Dec. 1, 2011", Nov. 18, 2013, 1-22.

Ross, "Office Action issued in copending U.S. Appl. No. 13/673,380, filed Nov. 9, 2012", Apr. 17, 2014, 1-14.

Ross, "Office Action issued in copending U.S. Appl. No. 13/673,380, filed Nov. 9, 2012", Jun. 19, 2013, 1-11.

Steinhauer, "Yahoo Boss Finds Profit in Searches", ProQuest: <URL:http://proquest.umi.com/pgdweb?did=647712191&sid=1&Fmt=3&clientid=19649&RQT=309&VName=PQD>, Apr. 10, 2003, 1-3.

Thompson, "Office Action issued in copending U.S. Appl. No. 13/593,345, filed Aug. 23, 2012", Mar. 28, 2013, 1-12.

Thompson, "Office Action issued in copending U.S. Appl. No. 13/593,345, filed Aug. 23, 2012", Apr. 7, 2014, 1-11.

Thompson, "Office Action issued in copending U.S. Appl. No. 13/593,345, filed Aug. 23, 2012", Oct. 23, 2013, 1-12.

Thompson, "Office Action issued in copending U.S. Appl. No. 13/593,345, filed Aug. 23, 2012", Oct. 23, 2014, 1-12.

Thompson, "Office Action issued in copending U.S. Appl. No. 13/593,400, filed Aug. 23, 2012", Mar. 28, 2013, 1-10.

Thompson, "Office Action issued in copending U.S. Appl. No. 13/593,400, filed Aug. 23, 2012", Mar. 31, 2014, 1-10.

Thompson, "Office Action issued in copending U.S. Appl. No. 13/593,400, filed Aug. 23, 2012", Oct. 23, 2013, 1-10.

Thompson, "Office Action issued in copending U.S. Appl. No. 13/593,400, filed Aug. 23, 2012", Oct. 24, 2014, 1-11.

Thompson, "Office Action issued in copending U.S. Appl. No. 13/593,440, filed Aug. 23, 2012", Mar. 28, 2013, 1-10.

Thompson, "Office Action issued in copending U.S. Appl. No. 13/593,440, filed Aug. 23, 2012", Mar. 28, 2014, 1-11.

Thompson, "Office Action issued in copending U.S. Appl. No. 13/593,440, filed Aug. 23, 2012", Oct. 23, 2013, 1-12.

Unknown, "buySafe Introduces Referral Program for Online Auction Protection Service", buySafe Press Release—<URL:http://www.buysafe.com/about_us/press/press_releases/12_15_03.html>, Dec. 15, 2003, 1-3.

Unknown, "buySafe Solves Retail Websites' Number One Problem: Gaining Buyer Confidence", buySafe Press Release—<URL:http://www.buysafe.com/about_us/press/press_releases/06_1_06.html>, Jun. 1, 2006, 1-2.

Unknown, "eBay Buyer Protection—1995-2011", <URL:http://web.archive.org/web/20110501062428/http://pages.ebay.com/help/policies/buyer-protection.html>, May 1, 2011, 1-7.

Unknown, "eBay Buyer Protection Covers Your Purchases", <URL:http://web.archive.org/web/20110527130621/http://pages.ebay.com/coverage/index.html>, May 27, 2011, 1.

Unknown, "Just in Time for the Holidays: bySAFE and The Hartford Launch First Bonding Service to Protect Consumers from Online Shopping Risks", buySafe Press Release—<URL:http://www.buysafe.com/about_us/press/press_release/11_17_03.html>, Nov. 27, 2003, 1-3.

* cited by examiner

CLUSTERING AND CLASSIFICATION OF RECENT CUSTOMER SUPPORT INQUIRIES

BACKGROUND

Typically, when a customer is experiencing an issue with a product or service, the customer will first seek to resolve problems via online self-help resources such as user forums, web pages, or search engines. When the customer finds they are unable to resolve the problem on their own, they typically will seek live conversation with a customer service representative (CSR), via telephone, instant messaging, or some other medium allowing for live conversation. In such a context, response time is of the essence in order to meet customer service expectations.

Conventional systems have been provided which allow for monitoring and tracking of customer activities such as emails and website visits, and presenting such information to the CSR. However, in order to place such customer activities in context, so as to understand the customer's issue, conventionally the CSR has been forced to analyze such activities, such as by reading through previously sent emails, in order to contextualize the customer's activities. Such analysis can be time consuming, and leaves the customer with the unpleasant experience of being "on hold" while the CSR performs such analysis. To improve the customer experience, it would be helpful to speed up this analysis and more quickly provide the customer with on-target and effective solutions.

SUMMARY

The disclosed subject matter relates to a machine-implemented method for enhanced customer support involving processing a first communication from a customer via a first communication service, obtaining a first classification, included in a plurality of predefined classifications for customer support issues, associated with the first communication, establishing a second communication between the customer and a customer service representative, and displaying to the customer service representative information about the first communication with an indication that the first classification is associated with the first communication.

The disclosed subject matter also relates to a machine-implemented method for enhanced customer support involving automatically determining a first plurality of classifications for customer issues corresponding to a plurality of customer communications processed via a first communication service, automatically determining a second plurality of classifications for customer issues corresponding to a plurality of customer communications processed via a second communication service, determining a plurality of common classifications for customer issues based on the first plurality of categories and the second plurality of categories, automatically determining a first classification, included in the plurality of common classifications, is associated with a first communication via the first communication service, and automatically determining a second classification, included in the plurality of common classifications, is associated with a second communication via the second communication service.

The disclosed subject matter further relates to a system for enhanced customer support, the system including one or more processors, and a machine-readable medium comprising instructions stored therein, which when executed by the processors, cause the processors to perform operations including processing a first communication from a customer via a first communication service, automatically obtaining a first classification, included in a plurality of predefined classifications for customer support issues, associated with the first communication, establishing a second communication between the customer and a customer service representative, obtaining a pre-generated solution for resolving an issue associated with the first classification, and displaying the pre-generated solution to the customer service representative.

The disclosed subject matter also relates to a machine-readable medium comprising instructions stored therein, which when executed by a machine, cause the machine to perform operations including processing a first communication from a customer via a first communication service, automatically obtaining a first classification, included in a plurality of predefined classifications for customer support issues, associated with the first communication, where the first classification is predetermined to be associated with a resource requested in the first communication, establishing a second communication between the customer and a customer service representative, and displaying to the customer service representative information about the first communication with an indication that the first classification is associated with the first communication.

The disclosed subject matter also relates to a machine-readable medium comprising instructions stored therein, which when executed by a machine, cause the machine to perform operations including.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
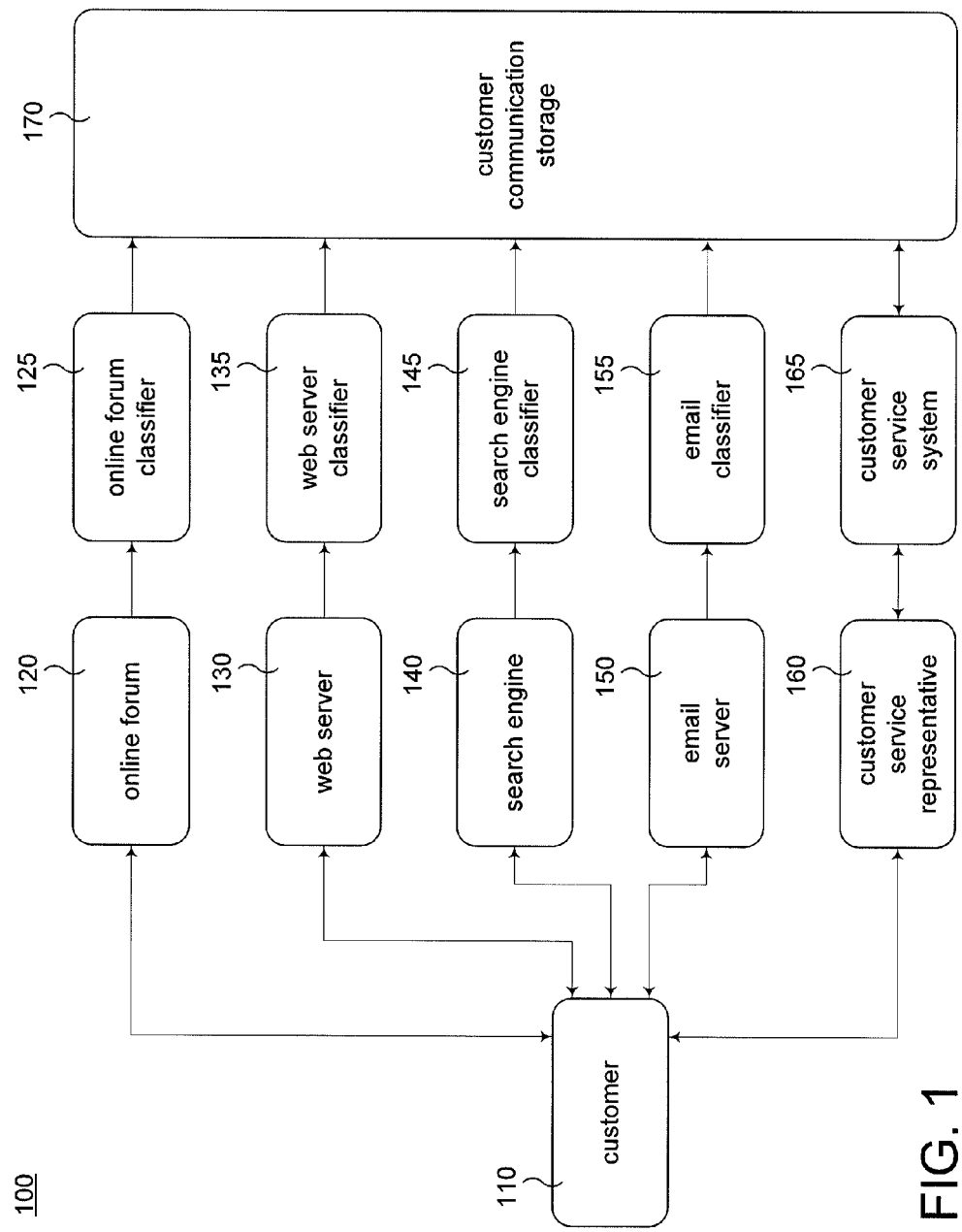
FIG. 1 illustrates an exemplary architecture diagram for the disclosed customer service techniques.

FIG. 1 illustrates an exemplary architecture diagram for the disclosed customer service techniques. When customer 110 has an issue with a product or service, a number of self-help systems are provided. In the example illustrated in FIG. 1, the available self-help systems include online forum 120, web server 130, search engine 140, and email server 150. Each offers a different channel of communication for customer 110.

Online forum 120 provides a mechanism by which customers are able to, via a web browser, create and review topics relating to the product or service, often relating to issues customers have encountered. Within these topics, customers may exchange comments, such as resolutions for such issues, or further details about their issues. Additionally, customer service representatives (CSRs) and/or product developers may participate in the discussion of topics, to provide feedback or solutions to customer issues. Various forum systems are well known and understood in the art, including bulletin board systems.

Web server 130 provides a web browser-accessible service by which customer 110 may review information published by the product or service provider, such as help pages directed to and addressing particular topics and issues commonly experienced by customers. Typically, such information is accessed as individual web pages, each having a unique identifier or address.

Although online forum 120 and web server 130 may present information in a fairly accessible and structured manner to facilitate the location of information therein, commonly such services are supplemented with a customer-accessible search engine 140. Information available via online forum 120 and web server 130 is indexed, and thereby made searchable via search engine 140. Typically, separate search engines are provided respectively for online forum 120 and web server 130, as they host different types of information. However, search engine 140 may also allow searching through information indexed from a plurality of sources, to provide a mechanism for customer 110 to search more generally for information. Customer 110, typically via web browser, submits a query, typically a textual query, to search engine 140. Search engine 140 identifies information items from the information it has indexed, and presents a list of results to customer 110, with each listed result presenting a brief summary of, and a hyperlink to, its respective information item. Using the web browser, customer 110 may follow a hyperlink to review the information item (e.g., a web page available via web server 130 or a forum posting via online forum 120). In this way, search engine 140 provides an efficient and familiar interface that allows customer 110 to more quickly locate information helpful for resolving an issue.

Customer 110 may also seek assistance by sending a email, which is received by email server 150. Once received, such emails may be processed manually by a customer service representative (CSR), and/or they may be automatically processed by a machine system that seeks to identify the issue experienced by customer 110, and a corresponding solution for the identified issue, which is sent to customer 110 by reply email. Classifier 155, which will be discussed in more detail below, may be used to identify the issue experienced by customer 110, or classifier 155 may utilize an issue identification rendered by another component dedicated to handling customer emails.

Each of the self-help systems 120, 130, 140, and 150 have respective classifiers 125, 135, 145, and 155. In some embodiments, separate classifier systems are provided for each channel of communication, in order to accommodate unique architectural considerations for their respective self-help systems or due to specific processing applied for each channel of communication. In some embodiments, a single, generally product-specific, system may perform classification for more than one, or even all, of self-help systems 120, 130, 140, and 150. When customer 110 makes use of a self-help system, such as by viewing a particular web page via web server 130, information regarding that usage is communicated to the respective classifier. Based on the received information, the classifier will classify the use. Various techniques will be explored in detail below. Then the classifier submits information, including a customer identifier, information about the use of the self-help system and the classification of the use rendered by the classifier, to customer communication storage 170, which stores such information for later use. In some embodiments, customer communication storage 170 will store such information for a limited and predetermined period of time, as typically only recent use of self-help systems 120, 130, 140, and 150 is useful for facilitating customer service interactions.

In some embodiments, classifiers 125, 135, 145, and 155 each employ machine learning techniques to perform automatic machine-based classification of information. As a product typically has issues specific to that particular product, the classifiers must be trained, and a collection of classifications, such as cluster labels, identified for various issues (e.g., "cannot see my advertisement' and 'forgot password'). Where separate classifiers are used, a common set of classifications is identified to allow various uses of different self-help channels to still be grouped together. This common set of classifiers is utilized as predefined classifications for customer support issues which are commonly used by the separate classifiers for classifying customer communications, although there may be other classifications unique to various classifiers. Training of a classification algorithm performed by a classifier is performed by starting with a large collection of customer uses of the self-help systems associated with the classifier (which may be collected and stored using customer communication storage 170). This collection of data is used to train the classifier, which automatically identifies and generates a plurality of classifications, such as cluster labels. Afterwards, as noted above, consistent classifications are used across all of the classifiers. Initially, establishing common classifications may require manual effort, involving human review of classifications, determining where multiple classifications should be combined into a single classification, and deciding upon uniform labels (where used) across the classifications. In some embodiments, later on an additional classification process may be applied to automatically create a common set of classifications. In some circumstances, new classifications may be identified based on recurring issues that are not currently being identified or distinguished. Such new classifications are specifically noted, and sample corresponding customer communications provided, to a classifier for "retraining" for recognition of future communications within the new classifications.

Figure 4:
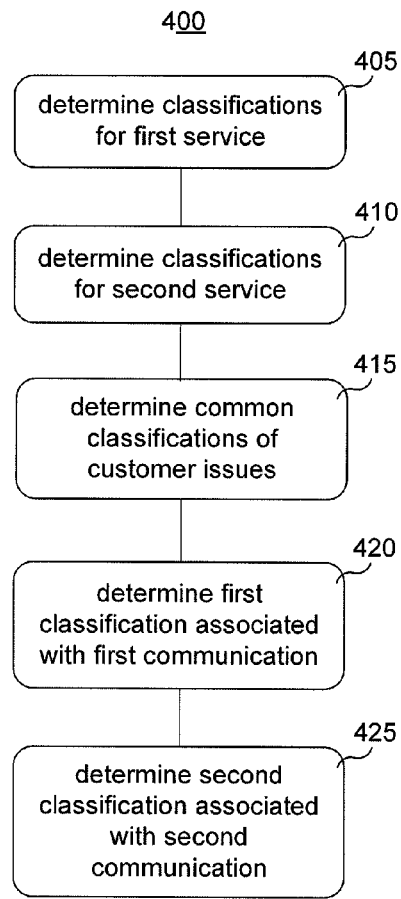
FIG. 4 illustrates a process 400 by which a common set of classifications is generated for communications processed via multiple communication services FIG. 5 conceptually illustrates an electronic system 500 with which some implementations of the subject technology are implemented

FIG. 4 illustrates a process 400 by which a common set of classifications is generated for communications processed via multiple communication services. In step 405, a first plurality of classifications for customer issues corresponding to a plurality of customer communications processed via a first communication service is automatically determined. In step 410, a second plurality of classifications for customer issues corresponding to a plurality of customer communications processed via a second communication service is automatically determined. In step 415, a plurality of common classifications for customer issues is determined based on the first plurality of categories and the second plurality of categories. In step 420, at least a first classification, included in the plurality of common classifications, is automatically associated with a first communication processed via the first communication service. In step 425, at least a second classification, included in the plurality of common classifications, is automatically associated with a second communication processed via the second communication service.

If the self-help services are determined to be ineffective for resolving the issue experienced by customer 110, customer 110 may be directed to discuss the issue with CSR 160. Customer 110 may contact CSR 160, for example, via telephone, instant messaging, or a "chat" interface via a web browser for text-based communication. To facilitate assisting customer 110, CSR 160 makes use of customer service system 165. Customer service system 165 provides CSR 160 with information including, for example, detailed information about an account for customer 110, previous discussions between customer 110 and other CSRs, and information about recent use of self-help systems 120, 130, 140, and 150 provided by customer communication storage 170. Use and operation of customer service system 165 is discussed in more detail below.

Figure 2A:
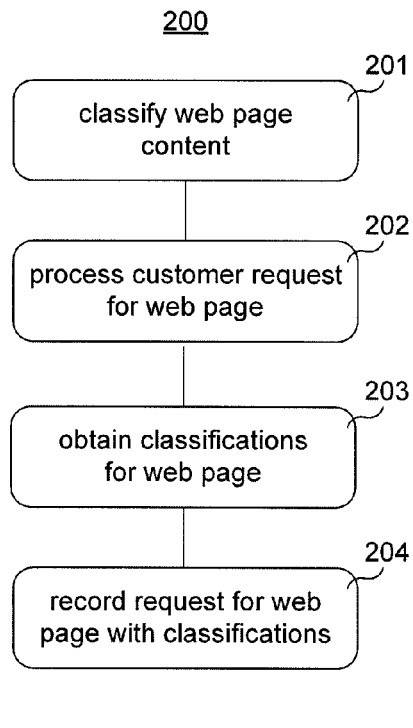
FIG. 2A illustrates a process 200 by which information is recorded by customer communication storage 170 regarding use of web server 130.

FIG. 2A illustrates a process 200 by which information is recorded by customer communication storage 170 regarding use of web server 130. As discussed above, information provided via web server 130 may be accessed by customer 110 as individual web pages, each associated with a unique identifier or address. As illustrated by step 201, in some embodiments the content of the web pages made available via web server 130 is classified in advance. In such embodiments, classifier 135 obtains contents of web pages made available via web server 130, and obtains classifications, such as cluster labels, for each of the web pages. Then, classifier 135 records the obtained classifications in association with their respective web pages. This may, for example, be stored in a database by classifier 135, or stored in conjunction with the web pages by web server 130. Although the above advance classification is generally more efficient, in some embodiments or circumstances, there may be dynamic classification, in which classifications are obtained for a web page at the time they are accessed by customer 110; for example, as a part of step 204 discussed below. One example where this may be useful is where a web page includes dynamic or customer-submitted content that changes over time.

At step 202, web server 130 processes a request from customer 110 for a particular web page. At step 203, classifier 135 obtains classifications, such as cluster labels, associated with the requested web page. In circumstances where dynamic classification is used, classifier 135 processes content of the requested web page to obtain the classifications. In some situations, once classifier 135 performs dynamic classification for a web page, classifier 135 may retain this information for use for future requests of the web page. This similarly applies to classifications dynamically obtained by classifiers 125 (online forum), 145 (search engine), and 155 (email). In circumstances where a web page has been classified in advance, the classifications previously recorded for the requested web page are obtained, as appropriate to the mechanism used to record the classifications (e.g., in an embodiment in which web server 130 maintains the classifications, the classifications may be transmitted as part of web server 130 notifying classifier 135 of the request for the web page). In step 204, customer communication storage 170 records information such as, for example, an identification for customer 110, an identifier for the particular web page that customer 110 accessed, the classifications obtained for the web page, and a date and time at which customer 110 requested the web page. In some embodiments, in addition to web pages, steps 201-204 may also be performed for other digital content made available via web server 130. The information recorded by customer communication storage 170 is later accessible to other systems, such as customer service system 165, as illustrated below in relation to FIG. 3.

Figure 2B:
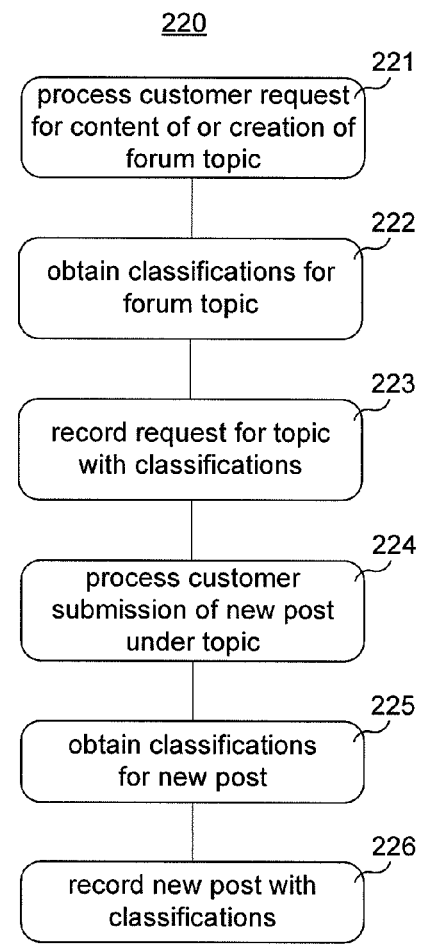
FIG. 2B illustrates a process 220 by which information is recorded by customer communication storage 170 regarding use of online forum 120.

FIG. 2B illustrates a process 220 by which information is recorded by customer communication storage 170 regarding use of online forum 120. At step 221, online forum processes a request from customer 110 for the content of a forum topic or a request to create a new forum topic while visiting online forum 120 via, for example, a web browser. In some embodiments of online forum 120, a listing a topics, with accompanying titles and/or summaries, is presented, from which customer 110 can request the content of a particular forum topic to review postings made under the selected topic. Additionally, in some embodiments of online forum 120, customer 110 may create a new topic for discussion. When a topic is created, it generally includes a title and a description, often presented as a first post under the topic, of the issue discussed in the topic. This information may be used, in step 222, by classifier 125 to obtain classifications, such as cluster labels, for the topic selected or created by customer 110. In some embodiments, step 222 may be performed in response to a notification from online forum 120 to classifier 125. In some embodiments, other posts and information (e.g., a title and description for the topic) included in the topic are also used by classifier 125 to obtain the classifications. In step 223, customer communication storage 170 records information such as, for example, an identification associated with customer 110, an identifier for the topic selected by customer 110, the classifications obtained in step 222 for the selected or created topic, and a date and time at which customer 110 selected or created the topic. In some embodiments, customer communication storage 170 may also specifically record whether customer 110 created the topic.

In some embodiments, posts submitted under topics are also classified. In step 224, online forum 120 processes a submission of a new post under an existing topic by customer 110. In step 225, classifier 125 obtains classifications, such as cluster labels, for the new post. In some embodiments, step 225 may be initiated by a notification from online forum 120 to classifier 125. In step 226, customer communication storage 170 records information such as, for example, an identification for customer 110, an identifier for the post submitted by customer 110, the classifications obtained in step 225 for the new post, and the date and time at which customer 110 submitted the post.

Figure 2C:
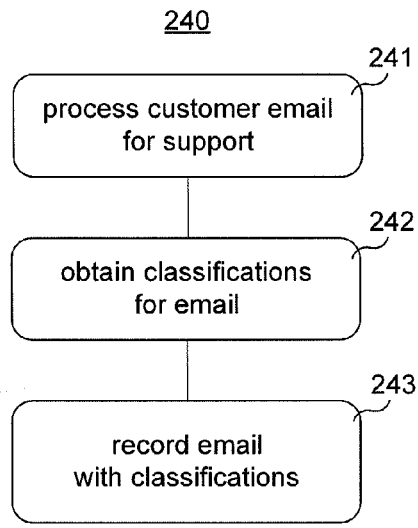
FIG. 2C illustrates a process 240 by which information is recorded by customer communication storage 170 regarding emails received by email server 150.

FIG. 2C illustrates a process 240 by which information is recorded by customer communication storage 170 regarding emails received by email server 150. In step 241, email server 150 processes an email with a support inquiry sent by customer 110 received by email server 150. In step 242, classifier 155 performs text-based classification upon content of the email, such as the subject and body portions of the email, to obtain one or more classifications, such as group labels, associated with the email. As discussed above, in some embodiments there may be an automated reply system for support emails, which also attempts to obtain classifications for the content of an email, and then replies with a pre-generated response based on the obtained classifications. For example, if the email is classified as relating to customer 110 having forgotten an account password, the automated reply system may reply with instructions detailing procedures for requesting recovery or a reset of the password, along with information for seeking further assistance if the automated response does not solve the issue for customer 110. Classifier 155 may generate classification categories based upon classifications performed by the automated reply system; for example, classifier 155 may group multiple narrow classifications generated by the automated reply system into a single broader classification category, or classifier 155 may simply convert an individual classification by automated reply system into one of the common classification categories for use by customer communication storage 170. In some embodiments, the automated reply system may rely on classifier 155 to perform classification by selecting a pre-generated response based on the classifications obtained by classifier 155 in step 242, and perform little or no classification of emails itself. In step 243, customer communication storage 170 records information such as, for example, an identification for customer 110, an identifier for the email submitted by customer 110, the classifications obtained for the email, and a date and time at which the email was sent or received. In addition to emails, the techniques illustrated with respect to FIG. 2C may similarly be applied to other customer text-based support-related inquiries, such as SMS messages, instant messages, and inquiries submitted via a web browser.

Figure 2D:
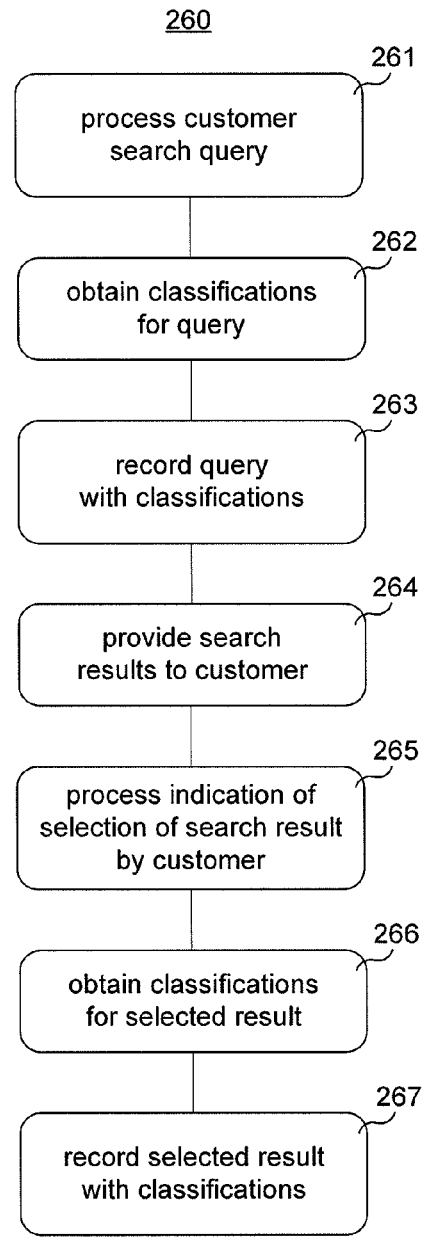
FIG. 2D illustrates a process 260 by which information is recorded by customer communication storage 170 regarding use of search engine 140.

FIG. 2D illustrates a process 260 by which information is recorded by customer communication storage 170 regarding use of search engine 140. As noted above, search engine 140 may be provided, for example, for online forum 120, enabling customer 110 to search through topics and posts; for web server 130, enabling customer 110 to search through web pages made available via web server 130; or as a search engine for information indexed from a plurality of sources, enabling customer 110 to search more generally for information. In step 261, search engine 140 processes a search query issued by customer 110. In step 262, classifier 145 generates classifications, such as cluster labels, for the search query. Often, search queries are only a few words long. Thus, automated classification of a search query may not be as specific or accurate as compared against classifications obtained by other classifiers which receive more text for classification. In some embodiments, search engine 140 may, as part of its search processing, perform classification of the submitted query and/or results obtained for the search query. Classification categories used by classifier 155 may be based on such classifications generated during the search processing, in order to take advantage of classification already performed by search engine 140. In step 263, customer communication storage 170 records information such as, for example, an identification for customer 110, the search query submitted by customer 110, the classifications obtained for the search query, and a date and time at which the search query was received or processed.

In step 264, results for the search responsive to the search query are provided to customer 110. In some embodiments, a listing of results is displayed, with each result including a brief description to allow customer 110 to assess its relevance from the displayed listing, and a hyperlink to allow the full information for the result (e.g., a web page) be obtained. In some embodiments, steps 265-267 may be performed. In step 265, search engine 140 processes an indication that customer 110 selected a particular search result (which typically indicates the hyperlink associated with the result was followed by the web browser used by customer 110). In step 266, classifications are obtained for the selected result. In some embodiments, the obtained classifications might be based upon classifications performed by search engine 140, either during search processing or initial indexing of the information associated with the search result. In step 267, customer communication storage 170 records information such as, for example, an identification for customer 110, an identifier for the search result selected by customer 110, the classifications associated with the selected search result, and a date and time at which the result was selected. In some embodiments, the search query may also be recorded with this information.

In some circumstances, steps 265-267 or steps 266-267 are not necessary. For example, where search engine 140 is provided for online forum 120, each of the results lead to topics managed by online forum 120, and classifier 125 will record any visits by customer 110 to these topics; thus, it would be redundant to classify and record selected search results as discussed above with respect to steps 265-267.

Online forum 120, web server 130, search engine 140, and email server 150 merely provide examples of sources of information for customer communication storage 170, and those skilled in the art appreciate that other systems that customer 110 interacts with can similarly be applied. For example, speech-to-text processing may be performed on verbal communication, such as a telephone call with customer 110, and the resultant text may be classified.

Figure 3:
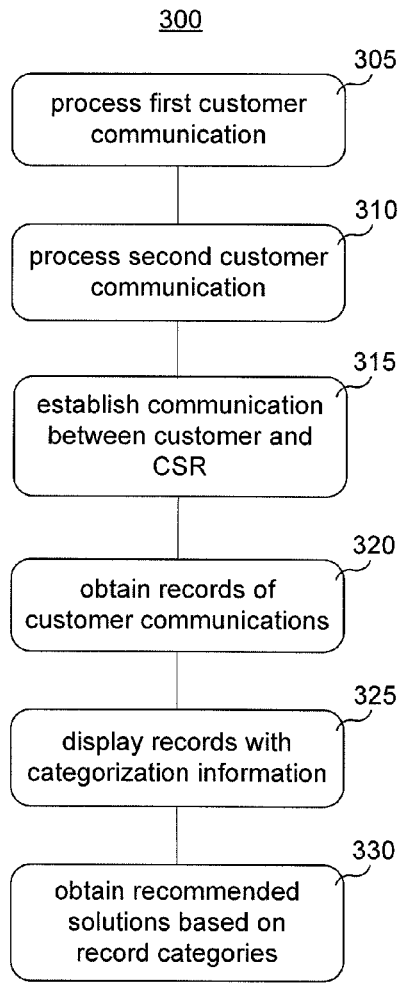
FIG. 3 illustrates a process 300 by which a customer 110 interacts with customer service system 165 and a customer service representative (CSR) 160 making use of customer service system 165.

FIG. 3 illustrates a process 300 by which a customer 110 interacts with customer communication storage 170 and a customer service representative (CSR) 160 making use of customer service system 165. In step 305, a first customer communication is processed via, for example, online forum 120, web server 130, search engine 140, or email server 150, as illustrated above with respect to FIGS. 2A-2D. In step 310, a second customer communication is processed via, for example, online forum 120, web server 130, search engine 140, or email server 150, as illustrated above with respect to FIGS. 2A-2D.

In step 315, customer 110 contacts CSR 160 after having utilized one or more of self-help services 120, 130, 140, and 150. In step 320, customer service system 165 obtains records stored by customer communication storage 170 in relation to customer 110. In some embodiments, the requested or obtained records may be restricted to a specified or predetermined period of time, such as the 3 hours immediately preceding customer 110 contacting CSR 160, in order to direction the attention of CSR 160 on what is most likely the immediate issue for customer 110. In step 325, information for the records is displayed to CSR 160 in conjunction with their respective classifications. In some embodiments, the records may be displayed to CSR 160 via a web browser. Those skilled in the art understand that there are many formats in which the records and the classifications may be presented to CSR 160. For example, the records may be presented in reverse chronological order (i.e., the most recent record first) with text labels corresponding to the classifications (in some embodiments, there may be human-readable text labels associated with classifications). As another example, records may be grouped according associated classifications to allow CSR 160 to more quickly identify for which classification there has been the most significant activity. In some embodiments, a text label for a classification may be selected, in response to which a more detailed description or explanation of the classifications may be made available for CSR 160 to review. In some embodiments, the displayed records may be sorted by various fields, such as the self-help system relating to the record, classifications, and the time associated with the record. In some embodiments, each displayed record includes a hyperlink that allows CSR 160 to view the underlying data relating to the record (e.g., the particular web page viewed via web server 130; the particular forum topic that was viewed; or the email received by email server 150, along with any related emails, such as automated replies).

In some embodiments, in step 330 pre-generated, recommended solutions may be provided to CSR 160 based on the classifications. A recommended solution may provide, for example, a series of steps for CSR 160 to resolve the issue, including hyperlinks that direct a web browser used by CSR 160 to information or systems useful for resolving the issue. In some embodiments, a set of prepared instructions for customer 110 may be automatically provided, and sent to customer 110 by CSR 160 via email or chat, for example.

The following is an example of the above techniques:

1. 10:00 am. Customer 110 clicks on in-product help via web server 130, and navigates to the section "Can't see my ads"

2. 10:01 am. Web server classifier 135 is notified of a request of a web page associated with this section and obtains a classification labeled "Can't see my ads" for records stored in customer communication storage 170

3. 10:02 am. Customer 110 is redirected to help center via web server 130 and views 3 additional pages, all under the category "Can't see my ads"

4. 10:03 am. Web server classifier 135 is notified of requests for each of these pages and obtains a classification labeled "Can't see my ads" for records stored in customer communication storage 170

5. 10:03 am. Customer 110 decides to contact customer service via telephone 6. 10:05 am. CSR 160 fields the telephone communication, and uses customer service system 165 instantly sees that customer 110 had recent support inquiries with classifications labeled "Can't see my ads." CSR quickly understands the customer's context and offers customer 110 alternatives besides those suggested by the in-product help and help center pages that customer 110 has already reviewed.

By obtaining classifications associated with the use of the self-help systems by customer 110 in advance of customer 110 contacting CSR 160, when customer 110 contacts CSR 160, CSR 160 is more quickly able to ascertain a context for the contact by customer 110. This allows CSR 160 to quickly understand and arrive at solutions for the issue customer 110 is attempting to resolve. The resulting improvement in time to reach a positive resolution of the issue increases the efficiency of the CSRs, and also enhances customer satisfaction. Also, the use of automated techniques for classifying customer communications provides a consistent, objective mechanism for classification that can be quickly executed, so as to immediately provide contextual information to CSRs when contacted by customers.

Obtaining classifications for customer communications is described above as being performed, or being submitted to be performed, immediately in response to use of self-help systems, which helps ensure that when a customer 110 contacts CSR 160, classifications for these communications are immediately available to ensure prompt assistance. However, in some embodiments obtaining classifications may be deferred until customer 110 actually seeks to communicate with CSR 160. This has an advantage in that it substantially reduces the amount of classification processing performed by the classifiers. On the other hand, to ensure such classifications are quickly available for use by CSR 160, the overall architecture must be configured to quickly perform "on the fly" classification of past communications once customer 110 contacts, or requests contact with, CSR 160. Such deferred of classification may not be useful where records stored by customer communication storage 170 are used by other systems besides customer service system 165, such as report generation systems which review records across all customers to identify support issues of current interest to customers.

The information recorded by customer communication storage 170 may be put to other uses to enhance customer service. For example, by reviewing the records stored in customer communication storage 170 across all customers, and the amounts of records stored for various classifications, it may be possible to identify particular areas in which either a new problem may have arisen with the product, based on an unexpected increase in records stored for a particular classification, or it may be possible to identify areas in which improvements may be made to reduce customer service inquiries, based on classifications for which a significant number of records are consistently generated. In some embodiments, in the interest of providing greater service to particular customers, customer communication storage 170 may be configured to generate a notification, such as an email, upon receiving records for these particular customers. This allows for issues experienced by these particular customers to be proactively addressed.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
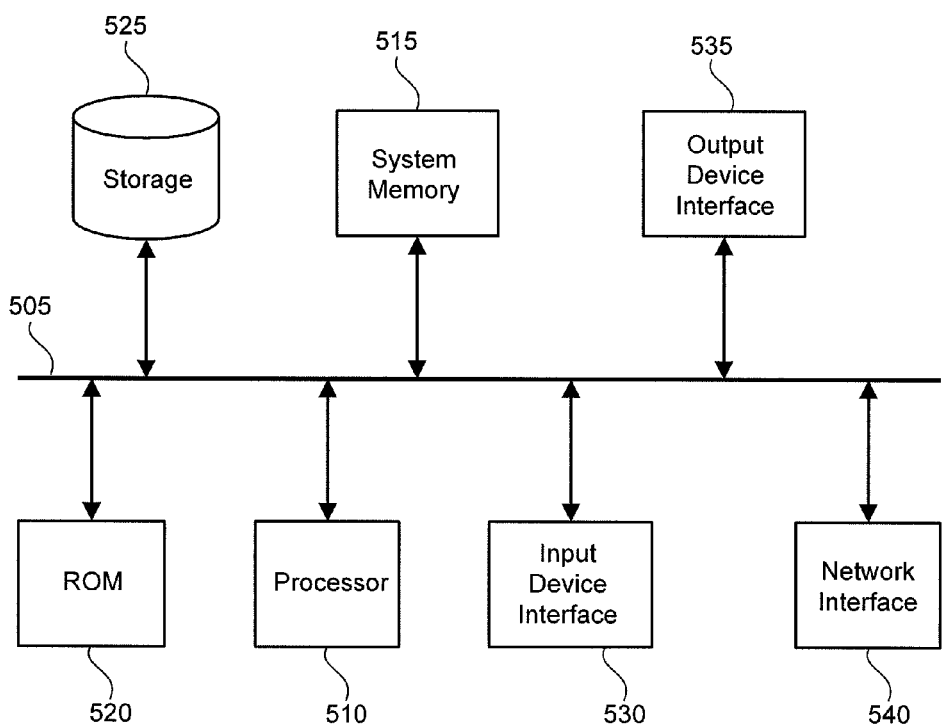

FIG. 5 conceptually illustrates an electronic system 500 with which some implementations of the subject technology are implemented. The electronic system 500 can be a computer, phone, PDA, or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only 520, the system memory 515, and the permanent storage device 525.

From these various memory units, the processing unit(s) 510 retrieves instructions to execute and data to process in order to execute the processes of the invention. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some implementations of the invention use a mass-storage device (such as a magnetic or optical disk and its corresponding disk drive) as the permanent storage device 525.

Other implementations use a removable storage device (such as a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the invention's processes are stored in the system memory 515, the permanent storage device 525, and/or the read-only memory 520. For example, the various memory units include instructions for processing multimedia items in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, such as cathode ray tubes (CRT) or liquid crystal displays (LCD). Some implementations include devices such as a touchscreen that functions as both input and output devices.

Finally, as shown in FIG. 5, bus 505 also couples electronic system 500 to a network (not shown) through a network interface 540. In this manner, the computer can be a part of a network of computers (such as a local area network ("LAN"), a wide area network ("WAN"), or an Intranet, or a network of networks, such as the Internet. Any or all components of electronic system 500 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for enhanced customer support comprising:
    processing a first communication from a customer via a first communication service;
    automatically obtaining a first classification, included in a plurality of predefined classifications for customer support issues, associated with the first communication;
    establishing a second communication between the customer and a customer service representative, wherein the first communication and the second communication correspond to separate requests for customer support by the customer; and
    displaying to the customer service representative information about the first communication with an indication that the first classification is associated with the first communication;
    determining that a threshold number of customer requests corresponding to the first classification have been submitted; and
    identifying, in response to the determination, the first classification as a problem to be proactively addressed.

2. The method of claim 1, wherein
    the first communication is a request for a web page by the customer; and
    the first classification is associated with the web page prior to processing the first communication.

3. The method of claim 1, further comprising:
obtaining a pre-generated solution for resolving an issue associated with the first classification; and
displaying the pre-generated solution to the customer service representative.

4. The method of claim 1, further comprising:
processing a third communication from a customer via a second communication service;
automatically obtaining a second classification, included in the plurality of predefined classifications for customer support issues, associated with the third communication; and
displaying to the customer service representative information about the third communication with an indication that the second classification is associated with the third communication, wherein
the first communication is a request for a web page by the customer;
the second communication is an email sent by the customer; and
the second classification is obtained based on text included in the subject and/or body portions of the email.

5. The method of claim 1, further comprising:
processing a third communication from a customer via a second communication service;
determining a second classification, included in the plurality of predefined classifications for customer support issues, associated with the third communication; and
displaying to the customer service representative information about the third communication with an indication that the second classification is associated with the third communication, wherein
the first communication is a request for a web page by the customer;
the third communication is a request for a forum topic by the customer; and
the second classification is determined based on text included in the forum topic.

6. The method of claim 1, further comprising:
determining that the first communication service is ineffective for resolving the first communication,
wherein establishing the second communication is in response to the determination.

7. The method of claim 1, wherein automatically obtaining the first classification is based on a classifier trained for the customer support issues corresponding to the plurality of predefined classifications.

8. The method of claim 1, wherein establishing the second communication is in response to a request received from the customer to establish the second communication, and wherein automatically obtaining the first classification is deferred until the request is received from the customer.

9. The method of claim 1, further comprising:
storing the information about the first communication with the indication that the first classification is associated with the first communication for a predetermined period of time,
wherein the displaying is based on accessing the stored information within the predetermined period of time.

10. A machine-implemented method for enhanced customer support comprising:
automatically determining a first plurality of classifications for customer support issues corresponding to a plurality of customer communications processed via a first communication service;
automatically determining a second plurality of classifications for customer support issues corresponding to a plurality of customer communications processed via a second communication service;
determining a plurality of common classifications for customer support issues based on the first plurality of categories and the second plurality of categories;
automatically determining that a first classification, included in the plurality of common classifications, is associated with a first communication processed via the first communication service, wherein the first communication is separate from the plurality of customer communications processed via the first communication service; and
automatically determining that a second classification, included in the plurality of common classifications, is associated with a second communication processed via the second communication service, wherein the second communication is separate from the plurality of customer communications processed via the second communication service;
determining that a threshold number of customer requests corresponding to at least one of the first classification or the second classification have been submitted; and
identifying, in response to determining of the threshold, the respective first classification or second classification as a problem to be proactively addressed.

11. The method of claim 10, wherein
the first communication is a request for a web page;
the second communication is an email.

12. The method of claim 10, wherein
the first communication is a request for a web page;
the second communication is search query.

13. The method of claim 10, further comprising:
establishing a third communication between the customer and a customer service representative; and
displaying to the customer service representative information about the first communication with an indication that the first classification is associated with the first communication and information about the second communication with an indication that the second classification is associated with the second communication.

14. The method of claim 13, further comprising:
obtaining a pre-generated solution for resolving an issue associated with the first classification; and
displaying the pre-generated solution to the customer service representative.

15. A system for enhanced customer support, the system comprising:
one or more processors; and
a machine-readable medium comprising instructions stored therein, which when executed by the processors, cause the processors to perform operations comprising:
processing a first communication from a customer via a first communication service;
automatically obtaining a first classification, included in a plurality of predefined classifications for customer support issues, associated with the first communication;
establishing a second communication between the customer and a customer service representative, wherein the first communication and the second communication correspond to separate requests for customer support by the customer;
obtaining a pre-generated solution for resolving an issue associated with the first classification; and
displaying the pre-generated solution to the customer service representative;

determining that a threshold number of customer requests corresponding to the first classification have been submitted; and identifying, in response to the determination, the first classification as a problem to be proactively addressed.

16. The system of claim 15, wherein
the first communication is a request for a web page by the customer; and
the first classification is determined to be associated with the web page prior to processing the first communication.

17. The system of claim 15, the instructions further causing the processors to perform operations comprising:
displaying to the customer service representative information about the first communication with an indication that the first classification is associated with the first communication.

18. The system of claim 15, the instructions further causing the processors to perform operations comprising:
processing a third communication from a customer via a second communication service;
automatically obtaining a second classification, included in the plurality of predefined classifications for customer support issues, associated with the third communication; and
displaying to the customer service representative information about the third communication with an indication that the second classification is associated with the third communication, wherein
the first communication is a request for a web page by the customer;
the second communication is an email sent by the customer; and
the second classification is obtained based on text included in the subject and/or body portions of the email.

19. The system of claim 15, the instructions further causing the processors to perform operations comprising:
processing a third communication from a customer via a second communication service;
automatically determining a second classification, included in the plurality of predefined classifications for customer support issues, associated with the third communication; and
displaying to the customer service representative information about the third communication with an indication that the second classification is associated with the third communication, wherein
the first communication is a request for a web page by the customer;
the third communication is a request for a forum topic by the customer; and
the second classification is determined based on text included in the forum topic.

20. A non-transitory machine-readable medium comprising instructions stored therein, which when executed by a machine, cause the machine to perform operations comprising:
processing a first communication from a customer via a first communication service;
automatically obtaining a first classification, included in a plurality of predefined classifications for customer support issues, associated with the first communication, wherein the first classification is predetermined to be associated with a resource requested in the first communication;

establishing a second communication between the customer and a customer service representative, wherein the first communication and the second communication correspond to separate requests for customer support by the customer; and
displaying to the customer service representative information about the first communication with an indication that the first classification is associated with the first communication;
determining that a threshold number of customer requests corresponding to the first classification have been submitted; and
identifying, in response to the determination, the first classification as a problem to be proactively addressed.

21. The machine-readable medium of claim 20, wherein
the first communication is a request for a web page by the customer; and
the first classification is determined to be associated with the web page prior to processing the first communication.

22. The machine-readable medium of claim 20, the instructions further causing the machine to perform operations comprising:
obtaining a pre-generated solution for resolving an issue associated with the first classification; and
displaying the pre-generated solution to the customer service representative.

23. The machine-readable medium of claim 20, the instructions further causing the machine to perform operations comprising:
processing a third communication from a customer via a second communication service;
automatically obtaining a second classification, included in the plurality of predefined classifications for customer support issues, associated with the third communication; and
displaying to the customer service representative information about the third communication with an indication that the second classification is associated with the third communication, wherein
the first communication is a request for a web page by the customer;
the second communication is an email sent by the customer; and
the second classification is obtained based on text included in the subject and/or body portions of the email.

24. The machine-readable medium of claim 20, the instructions further causing the machine to perform operations comprising:
processing a third communication from a customer via a second communication service;
automatically determining a second classification, included in the plurality of predefined classifications for customer support issues, associated with the third communication; and
displaying to the customer service representative information about the third communication with an indication that the second classification is associated with the third communication, wherein
the first communication is a request for a web page by the customer;
the third communication is a request for a forum topic by the customer; and
the second classification is determined based on text included in the forum topic.

* * * * *